United States Patent [19]
Dence

[11] 3,759,295
[45] Sept. 18, 1973

[54] CONTROL VALVE FOR HYDROSTATIC DRIVE
[75] Inventor: Donald S. Dence, Brooklyn, Mich.
[73] Assignee: Clark Equipment Company, Buchanan, Mich.
[22] Filed: Apr. 19, 1971
[21] Appl. No.: 135,283

[52] U.S. Cl............................. 137/625.47, 180/6.3
[51] Int. Cl............................................. F16k 11/00
[58] Field of Search...................... 137/625.47, 597; 180/6.3

[56] References Cited
UNITED STATES PATENTS
| | | | |
|---|---|---|---|
| 810,877 | 1/1906 | McKeown | 137/625.47 |
| 717,308 | 12/1902 | Weichman | 137/625.47 X |

Primary Examiner—Robert G. Nilson
Attorney—Kenneth C. Witt, John C. Wiessler, Robert H. Johnson, Lewis J. Lamm and Robert J. Morton

[57] ABSTRACT

A control valve having two parallel fluid passages through the body portion thereof and a valve element pivotally located between the parallel passages. The valve element has a connecting channel therethrough and may be pivoted in either direction to present the channel's inlet to one fluid passage and its outlet to the other so that fluid may be selectively diverted through the channel from passage to passage by pivoting the valve element. The passage into which the channel's inlet is pivoted is reduced in flow area when the valve element is pivoted into that passage, but enlargements are provided in both passages so that the flow area of the passage into which the channel outlet is pivoted is not substantially reduced, thereby encouraging fluid to flow through the channel in the desired direction. This control valve may be used in a hydrostatically driven vehicle having a fixed ratio flow divider which directs equivalent flows to the individual driving motors of the vehicle, the control valve being located in the fluid circuit between the flow divider and the driving motors to selectively divert a portion of the working fluid intended for one motor to the other and thereby provide a "differential" action between driving wheels.

7 Claims, 3 Drawing Figures

PATENTED SEP 18 1973
3,759,295
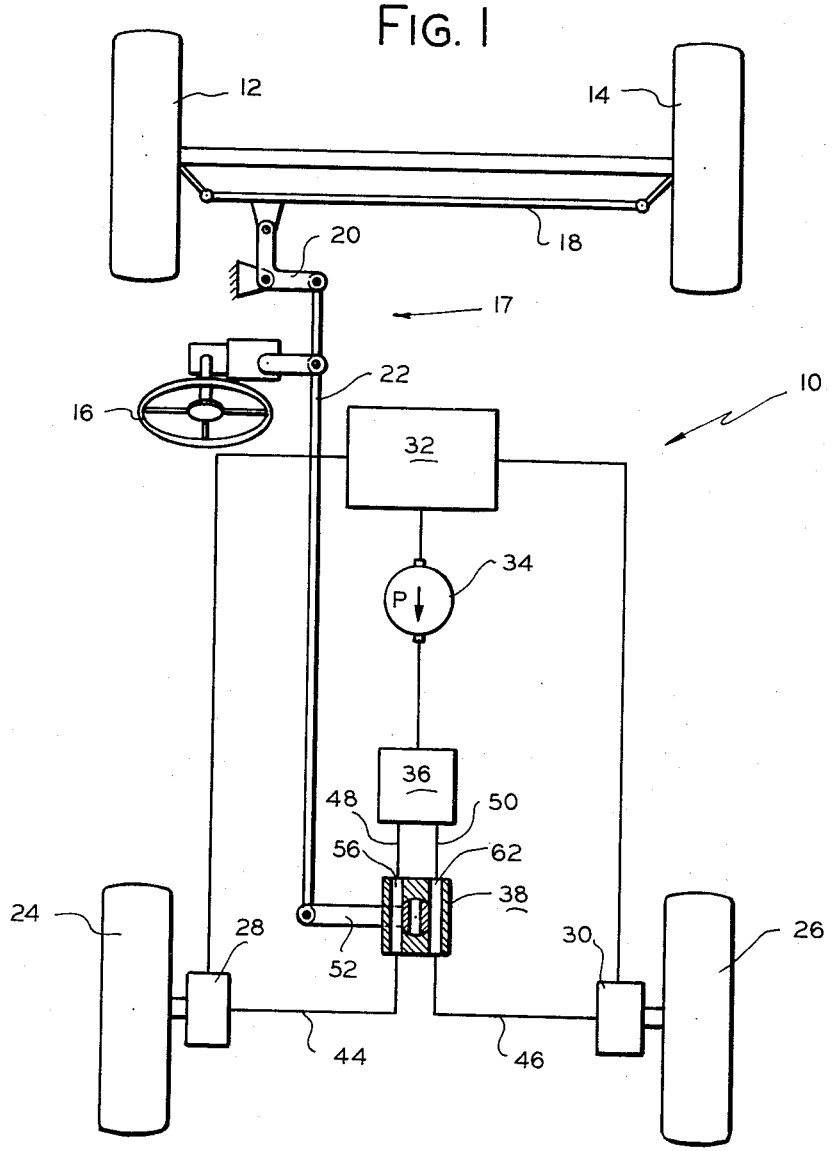
FIG. 1
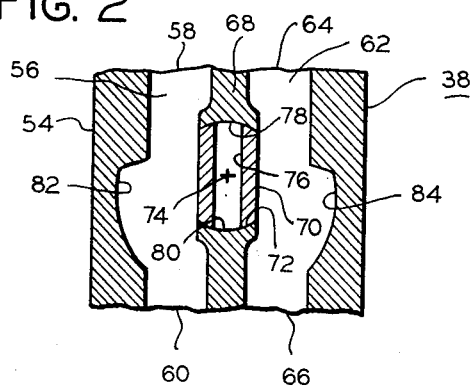
FIG. 2
FIG. 3
INVENTOR
DONALD S. DENCE
BY Robert J. Horton
ATTORNEY

CONTROL VALVE FOR HYDROSTATIC DRIVE

BACKGROUND OF THE INVENTION

Hydrostatic drives for vehicles are known in which each vehicle driving wheel is separately driven by a hydraulic motor while all hydraulic motors are supplied with pressurized operating fluid from a single pump. The fluid circuitry of such hydrostatic drives conventionally takes two forms, one in which the hydraulic motors are connected to the pressure source in "parallel" relationship with each other, and the other in which the motors are connected in "series" relationship with each other. These two type fluid circuits have individual inherent advantages and disadvantages; for example, in the parallel type the fluid from the pressure source may prefer the path of least resistance and complete its circuit through the hydraulic motor whose work load is lightest — thereby providing the advantage of a natural "differential" action to compensate for the greater distance the driving wheel on the "outside" of a vehicle must travel as the vehicle negotiates a turn, but having the disadvantage of a total loss of traction if either driving wheel is permitted to turn freely due to slippery ground or an uneven roadway. In the series type of fluid circuit the entire flow of fluid passes through each hydraulic motor so that each driving wheel is driven whether or not it exerts a tractive force. However, this desirable feature of the series circuit may be outweighed by the undesirable "scrubbing" or sliding of driving wheels which occurs during a vehicle turn since each wheel must operate at the same linear speed because the same amount of fluid must pass through each motor. A satisfactory solution to these problems was disclosed in U.S. Pat. No. 3,151,694 which proposed parallel circuitry with a variable flow divider to continuously regulate the division of flow between the driving motors. Variable flow dividers, however may be mechanically complicated and expensive in both first cost and maintenance.

An object of the present invention is to provide a control valve which may be used in a hydrostatic drive system to provide means for economically avoiding the disadvantages inherent in the circuit forms aforementioned.

SUMMARY OF THE INVENTION

In carrying out my invention in one preferred embodiment, I provide a control valve having first and second passages located through the body portion thereof. The passages are separated by a common wall having a bore therein and a valve element is disposed in the bore to pivot in either direction about the bore's axis. A connecting channel extending through the valve element permits the diversion of a selectable amount of fluid therethrough from the first passage to the second passage when the valve element is pivoted in one direction and the diversion of fluid from the second passage to the first when the valve element is pivoted in the opposite direction. When the valve element is pivoted to present the connecting channel's inlet to one of the fluid passages the flow area of that passage is reduced, but enlargements are formed in both passages so that the flow area of a passage is not substantially reduced when the channel's outlet is pivoted into that passage so that fluid is encouraged to flow through the connecting channel in the desired direction. The valve element may also be pivoted to a centered position wherein the connecting channel is not in communication for the transfer of fluid from either the first or second passage and in this position fluid entering the valve through one passage exits the valve through that same passage.

BRIEF DESCRIPTION OF THE DRAWING

FIG. 1 is a schematic representation of a vehicle with hydrostatic drive embodying the control valve of this invention, FIG. 2 is a sectional view of the control valve shown in FIG. 1 and illustrating the position of the valve components when the vehicle is operating straightaway, and FIG. 3 is a sectional view similar to that of FIG. 2 but illustrating the position of the valve components when the vehicle is negotiating a turn to the left as viewed in FIG. 1.

DESCRIPTION OF PREFERRED EMBODIMENT

Referring to FIG. 1, a vehicle embodying the control valve of this invention is indicated generally by the numeral 10. Vehicle 10 is provided at the forward end thereof with the usual dirigible wheels 12 and 14 which are controllable by means of the common steering wheel 16 through a steering control linkage indicated at 17 which includes a tie rod 18, a bell crank 20, and an actuating rod 22. The driving wheels 24 and 26 provided at the rearward end of vehicle 10 are individually driven by separate hydraulic motors 28 and 30, respectively, so that the differential linear speeds between the inside and the outside driving wheel when vehicle 10 is executing a turn may be compensated for to prevent wheel skid. Motors 28 and 30 may be of either the common piston or other positive displacement type whose output speed is proportional to the volume of fluid directed through the motors and they are a part of a hydrostatic system including a fluid pressure device, or pump, 34 which draws working fluid from a reservoir 32 and supplies it under pressure to a fixed ratio flow divider 36. Flow divider 36 is connected to supply separate, but equivalent, flows to a flow proportioning means or control valve 38 through the lines 48 and 50 and control valve 38 directs this flow to driving motors 28 and 30 through their respective supply lines 44 and 46. Control valve 38 is operatively connected to actuating rod 22 through the lever 52 and is adapted as hereinafter explained, to selectively proportion the volume of flow directed through lines 44 and 46 to their respective motors by diverting a portion of the fluid normally intended for one hydraulic motor to the other in response to the steering of dirigible wheels 12 and 14. In this manner, when vehicle 10 is executing a turn the driving wheel motor on the outside of such turn may receive a portion of the fluid normally intended for the driving wheel motor on the inside of such turn to thereby compensate for the greater distance such outside wheel must travel while the vehicle is turning.

Referring now to FIG. 2, control valve 38 is shown in more detail and with its components in a centered position appropriate for straight ahead movement of vehicle 10. In this position the division of flow determined by flow divider 36 is unaffected by the control valve and driving motors 28 and 30 operate at the same rotative speed. The valve casing or body portion 54 of the control valve has a first fluid passage 56 extending therethrough with suitable connecting means (not shown) at the inlet 58 thereof for connection with line 48 (FIG. 1) from the flow divider and also with suitable connecting means at the outlet 60 thereof for connection with motor supply line 44. The valve body has a second fluid passage 62 extending therethrough which is an allochiral duplicate of first passage 56 and which also has suitable connecting means at its inlet 64 and outlet 66 for connection with lines 50 and 46 rspectively. Between first passage 56 and second passage 62 is a dividing portion or common wall 68 which may be formed as a part of valve body 54, but in any event segregates the fluid flowing through passage 56 from the fluid flowing through passage 62. In order to provide for the selective flow of fluid between passage 56 and passage 62 a valve element 70 is pivotally disposed within a bore 72 formed in dividing portion 68 to pivot about the axis 74 of bore 72. Extending through valve element 70 is a connecting channel 76 for the flow of fluid therethrough from one fluid passage 56 or 62 to the other when the valve element is pivoted to present the inlet end 78 of channel 76 to one passage and the outlet end 80 of channel 76 to the other passage. As valve element 70 is pivoted to place channel inlet 78 in communication with one of said fluid passages (as shown in FIG. 3) the flow area of that passage is reduced, but enlargements as indicated at 82 and 84 are formed in passages 56 and 62, respectively, so that the flow area of the passage into which channel outlet end 80 is pivoted is not substantially reduced as the valve element is pivoted. In this manner fluid is encouraged to flow through connecting channel 76 from inlet to outlet and the volume of fluid directed to driving motors 28 and 30 may be proportioned by reducing the amount delivered to one motor supply line 44 or 46 and increasing the amount delivered to the other.

The operation of control valve 38 is perhaps more readily understood with reference to FIG. 3 which shows valve element 70 pivoted to a position adapted to divert a portion of the fluid from passage 56 through connecting channel 76 to passage 62. As viewed in FIG. 3, valve element 70 has been pivoted counter-clockwise from the position shown in FIG. 2 so that inlet end 78 of channel 76 communicates with fluid passage 56 and outlet end 80 communicates with passage 62. In this position the flow area of passage 56 has been reduced by the insertion of the valve element into that passage while the flow area of passage 62 has not been substantially reduced due to enlargement 84, therefore the static pressure at channel inlet 78 is greater than the static pressure of channel outlet 80 and a portion of the fluid flowing through passage 56 is urged to pass through connecting channel 76 and into passage 62. It will now be understood that the amount of fluid transferred from one fluid passage 56 or 62 to the other may be regulated by the angle through which valve element 70 is pivoted about its axis, and further that the valve element may be pivoted clockwise from the position shown in FIG. 2 to effect the transfer of fluid from passage 62 to passage 56. When vehicle 10 is operating in the straight ahead mode control valve 38 is in the central position shown in FIG. 2 so that flow is not diverted from either passage to the other and motors 28 and 30 are supplied with equivalent flows as regulated by fixed ratio flow divider 36. As vehicle 10 negotiates a turn valve element 38 is pivoted by lever 52 in response to the movement of actuator rod 22 so that a portion of the fluid normally intended for the motor on the inside of such turn is diverted by the control valve to the motor on the outside of such turn.

While I have described and illustrated herein one preferred embodiment of my invention, it will be appreciated that modifications may be made therein which fall within the spirit and scope of my invention.

I claim:

1. A control valve comprising:

a valve body having first and second fluid passages therethrough, a valve element disposed in said body between said first and second passages, said valve element having a connecting channel extending therethrough with an inlet end and an outlet end and being pivotal between a first position wherein the flow area of said first passage is reduced by said valve element and said channel inlet communicates with said first passage and said channel outlet communicates with said second passage, a second position wherein the flow area of said second passage is reduced by said valve element and said channel inlet communicates with said second passage and said channel outlet communicates with said first passage, and a central position wherein the flow areas of said first and second passages are not reduced by said valve element and said channel inlet and channel outlet do not communicate with either said first or second passage, said first and said second passages having enlarged portions positioned so that the flow area of said second passage is not reduced when said valve element is in said first position and the flow area of said first passage is not reduced when said valve element is in said second position.

2. A control valve comprising:

a valve body having first and second fluid passages therethrough, a valve element disposed in said body between said first and second passages, said valve element having a connecting channel extending therethrough with an inlet end and an outlet end and being pivotal between a first position wherein the flow area of said first passage is reduced by said valve element and said channel inlet communicates with said first passage and said channel outlet communicates with said second passage, a second position wherein the flow area of said second passage is reduced by said valve element and said channel inlet communicates with said second passage and said channel outlet communicates with said first passage, and a central position wherein the flow areas of said first and second passages are not reduced by said valve element and said channel inlet and channel outlet do not communicate with either said first or second passage, the ratio of the flow area of said first passage to the flow area of said second passage being reduced when said valve element moves from said central position toward said first position, and the ratio of the flow area of said second passage to the flow area of said first passage being reduced when said valve element moves from said central position toward said second position.

3. A hydrostatic drive system for a hydrostatically driven vehicle comprising:

a fluid pressure device, a fixed ratio flow divider connected to receive pressurized fluid from said pressure device and divide the flow of such flow into separate and equivalent flows, and a control valve having first and second fluid passages extending through the body thereof with said first and second passages having inlet ends connected to said flow divider to separately receive said separate fluid flows, said control valve also having a valve element disposed in said valve body between said first and second passages with a connecting channel having an inlet end and an outlet end extending through said valve element said valve element being pivotal between a first position wherein the flow area of said first passage is reduced by said valve element and said channel inlet communicates with said first passage and said channel outlet communicates with said second passage, a second position wherein the flow area of said second passage is reduced by said valve element and said channel inlet communicates with said second passage and said channel outlet communicates with said first passage, and a central position wherein the flow areas of said first and second passages are not reduced by said valve element and said channel inlet and channel outlet do not communicate with either said first or said second passage, said first and second passages of said control valve having enlarged portions positioned so that the flow area of said second passage is not reduced when said valve element is in said first position and the flow area of said first passage is not reduced when said valve element is in said second position.

4. A hydrostatic drive system for a hydrostatically driven vehicle comprising:

a fluid pressure device, a fixed ratio flow divider connected to receive pressurized fluid from said pressure device and divide the flow of such fluid into separate and equivalent flows, and a control valve having first and second fluid passages extending through the body thereof with said first and second passages having inlet ends connected to said flow divider to separately receive said separate fluid flows, said control valve also having a valve element disposed in said valve body between said first and second passages with a connecting channel having an inlet end and an outlet end extending through said valve element said valve element being pivotal between a first position wherein the flow area of said first passage is reduced by said valve element and said channel inlet communicates with said first passage and said channel outlet communicates with said second passage, a second position wherein the flow area of said second passage is reduced by said valve element and said channel inlet communicates with said second passage and said channel outlet communicates with said first passage, and a central position wherein the flow areas of said first and second passages are not reduced by said valve element and said channel inlet and channel outlet do not communicate with either said first or said second passage, the ratio of the flow area of said first passage to the flow area of said second passage being reduced when said valve element moves from said central position toward said first position and the ratio of the flow area of said second passage to the flow area of said first passage being reduced when said valve element moves from said central position toward said second position.

5. A hydrostatic drive system for a hydrostatically driven vehicle comprising, a fluid pressure device, a fixed ratio flow divider connected to receive pressurized fluid from said pressure device, and operative to divide the flow of that fluid into separate and equivalent flows into companion passages, and the fluid device being operative for continuously driving the flow of fluid through the companion passages, a control valve having first and second fluid passages extending through the body thereof with said first and second fluid passages having inlet ends connected to said flow divider to separately receive said separate fluid flows from said companion passages, said control valve also having a valve element disposed in said valve body between said first and second fluid passages with a connecting channel extending therethrough and also having a first end and a second end with an inlet end of a channel in the first end of the valve element and an outlet end of the channel in the second end of the valve element, said valve element being pivotal between a first position, wherein it is in an extreme position in a corresponding first direction, wherein the first end thereof extends into said first fluid passage without extending across that passage and the inlet end of the channel extends at least partially into and communicates with that fluid passage, and the second end extends into the second fluid passage without extending across that passage and the outlet end of the channel communicates with said second fluid passage, and a second position, wherein it is in an extreme position in a corresponding second direction, in which the first end of the valve element extends into the second fluid passage without extending across that passage and the inlet end of the channel extends at least partially into and communicates with that passage, and the second end extends into the first fluid passage without extending across that passage and the outlet end of the channel communicates with the first fluid passage, in a central position wherein the valve element does not extend into either of said fluid passages.

6. A hydrostatic drive system according to claim 5 wherein the channel in the valve element, in each position of the valve element, communicates fully throughout its own flow area with the respective passages.

7. A hydrostatic drive system according to claim 5 wherein said passages have relatively narrow portions, and the valve element when moved to either its said first or second position is disposed with its first end, and the inlet end of the channel therethrough, in the narrow portion of the respective passage, and said passages having relatively enlarged portions at positions for receiving the second end of the valve element, and the outlet end of the channel therethrough, when the valve element is moved to either its said first or second position, whereby the enlarged portions in the passages provide a flow area similar to the narrow portions of the passages notwithstanding the fact that the second end of the valve element is disposed in the respective passage.

* * * * *